Figure 3:
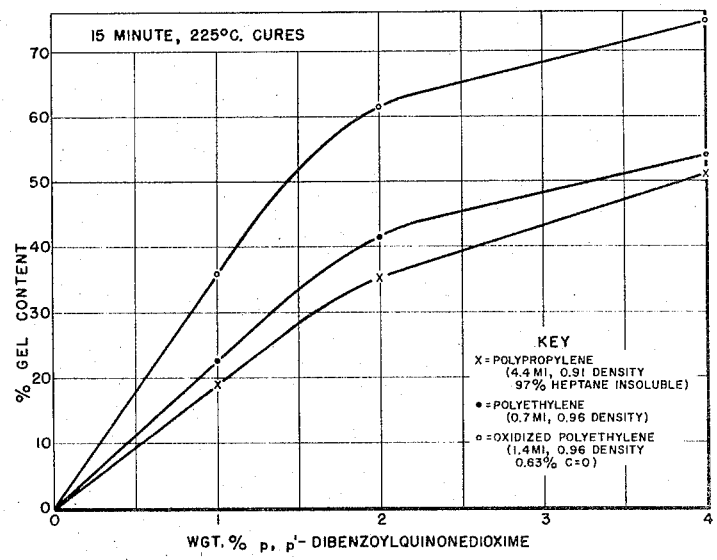

Feb. 21, 1967   C. L. KEHR   3,305,517
CROSSLINKED POLYOLEFINS AND PROCESS THEREFOR
Filed Jan. 18, 1962                                                2 Sheets-Sheet 1

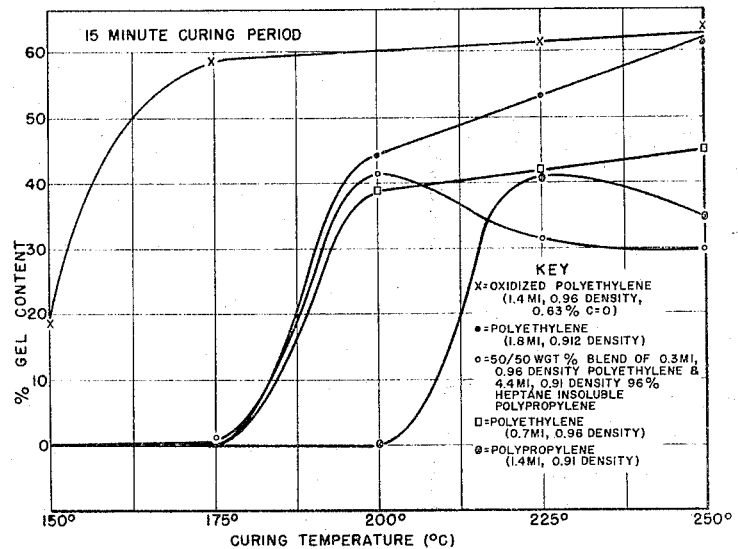

FIG. 1.
Effective Curing Temperature for Various Polyolefins Using 2 wgt. % p, p'-Dibenzoylquinonedioxime as the Crosslinking Agent.

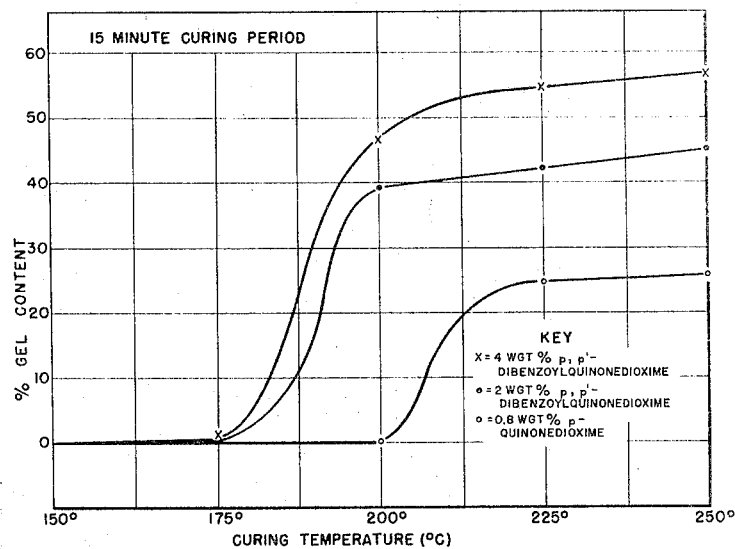

FIG. 2.
Effect of Curing Temperature on % Gel Content of 0.7 MI, 0.96 Density Polyethylene at Varying Concentrations of p, p'-Dibenzoylquinonedioxime and p-Quinonedioxime

CLIFTON L. KEHR
INVENTOR

BY *Richard P. Plunkett*

ATTORNEY

Feb. 21, 1967    C. L. KEHR    3,305,517
CROSSLINKED POLYOLEFINS AND PROCESS THEREFOR
Filed Jan. 18, 1962    2 Sheets-Sheet 2

Effect of p, p'-Dibenzoylquinonedioxime Concentration on % Gel Content of Various Polyolefins Crosslinking of Polypropylene with 2 wgt. % p, p'-Dibenzoylquinonedioxime at Various Temperatures and Curing Times

CLIFTON L. KEHR
INVENTOR

BY Richard G. Plunkett
ATTORNEY

United States Patent Office 3,305,517
Patented Feb. 21, 1967

3,305,517
CROSSLINKED POLYOLEFINS AND
PROCESS THEREFOR
Clifton L. Kehr, Silver Spring, Md., assignor to W. R. Grace & Co., New York, N.Y., a corporation of Connecticut
Filed Jan. 18, 1962, Ser. No. 166,025
8 Claims. (Cl. 260—41)

This invention relates to crosslinked polyolefins and methods of preparing same. More particularly this invention is concerned with crosslinking polyolefins at temperatures above their processing temperature with novel crosslinking agents.

In the polyolefin field there is more or less a constant search for new and better chemical crosslinking agents. Of special interest are those which are unreactive at processing temperatures, but which can be "triggered" in some fashion after the polymer compound has been processed into its final shape by extrusion, molding, or the like.

Polymers of ethylene such as those described in U.S. 2,153,553 and in U.S. 2,816,883 are well known in the art today and are generally characterized by their organic solvent solubility and their thermoplastic properties. In addition, polypropylene such as that made in accordance with Belgium Patent 543,259 issued to Montecatini and Karl Ziegler is another polyolefin which is finding wide acceptance in the plastics field. Lately several methods have been tried with varying success to decrease the thermoplasticity and solubility of the above polymers by crosslinking same. With regard to polyethylene, the main class of crosslinking agents have been organic peroxides and bisperoxides. Although it is known that various organic peroxides will cause crosslinking upon admixture with polyethylene, many have been found lacking in certain regards. Thus for example the use of benzoyl peroxide at the necessary blending temperatures is hazardous because the mixture may decompose violently. Still other peroxides lack a sufficiently long half-life at the temperature of incorporation into the molten ethylene polymer to permit uniform crosslinking therein. This latter problem is especially prevalent when the polyethylene is high density polyethylene, i.e. 0.94–0.97 described in U.S. 2,816,883, which has a melting point of at least 127° C. This high melting point necessitates the use of very high processing temperatures whereat most known crosslinking agents decompose at an excessive rate thereby crosslinking the polymer to a high degree so rapidly that compounding molding, extruding or other shaping operations are impossible on a commercial scale.

With regard to crosslinking polypropylene, the usual free radical method is more difficult due to the fact that degradation predominates over the crosslinking reaction at temperatures near to or above the processing temperatures of the polymer. The high crystalline melting point (about 170–175° C.) of the isotactic (crystalline) polymer is a major disadvantage. At temperatures this high, the polymer reacts rapidly with traces of oxygen, which then trigger rapid depolymerization and chain scission reactions. In addition conventional free radical generators, i.e. tertiary peroxides, azo compounds and the like, aggravate this situation and reduce polypropylene to low molecular weight "soup" or "wax" under conditions which normally crosslink polyethylene readily to a high percent gel content. Thus in the polyolefin art there has been a long felt want for a crosslinking agent which not only crosslinks at temperatures above the processing temperature of the polymer but also crosslinks at a rapid rate at said temperatures so as to require a very short cure time.

It is known in the art to vulcanize solid material selected from the group consisting of polyethylene and polypropylene and copolymers thereof by contacting said material with free radical generating compounds such as organic peroxides and a modifier of the group consisting of quinone dioxime and compounds of quinone dioxime wherein the H of an oxime group is replaced by an acyl group having 2 to 12 carbon atoms. See U.S. Patent having Serial No. 3,012,020 wherein the free radical generator is an integral and necessary part of the crosslinking mechanism.

Surprisingly it has now been found that normally solid polyolefins, especially those materials selected from the group consisting of polyethylene (low and high density), atactic and isotactic polypropylene, polybutylene, ethylene-propylene copolymers, ethylene-butylene copolymers, blends of polyethylene and polypropylene, etc., can be crosslinked to a high gel content by subjecting said material to the action of an ester of quinone dioxime as the sole essential crosslinking agent. Further, when these agents are used alone (in absence of peroxides or other free radical generating "activators") the resulting compounds are much more easily processed, i.e., they can be compounded and fabricated in a "safe" (free from precuring or "scorchiness") manner. Thus it was found possible to admix p-quinonedioxime and corresponding esters thereof into the molten polymers using standard processing equipment without a significant amount of crosslinking taking place. However, in any given compounded polymer system, it was possible to initiate crosslinking by heating the fabricated test sample to a temperature slightly higher than that required for the safe, scorch-free processing step. A few examples of the esters of quinone dioxime operable in this invention include: benzoate, acetate, maleate, propionate, butyrate, dodecenylsuccinate and laurate. Monoesters as well as diesters of quinone dioxime are operable in this invention. In addition it has also been found that some of the polyolefins mentioned above can be crosslinked by subjecting them to the action of p-quinone dioxime per se.

The amount of crosslinking agent necessary in the instant invention is not critical and can vary over wide limits. Thus an amount from about 0.1 to about 20% by weight of the polymer composition can be employed, but preferably 1 to 20% by weight is used. FIGURES 2 and 3, attached, show the effect on percent gel content when polyethylene, polypropylene and oxidized polyethylene are cured with different concentrations of p-quinonedioxime dibenzoate. It should be stated that the chemical names p,p'-dibenzoylquinonedioxime and p-quinonedioxime dibenzoate are used synonymously herein and both refer to a chemical compound of the formula:

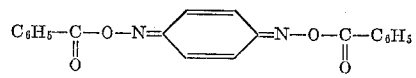

Figure 4:
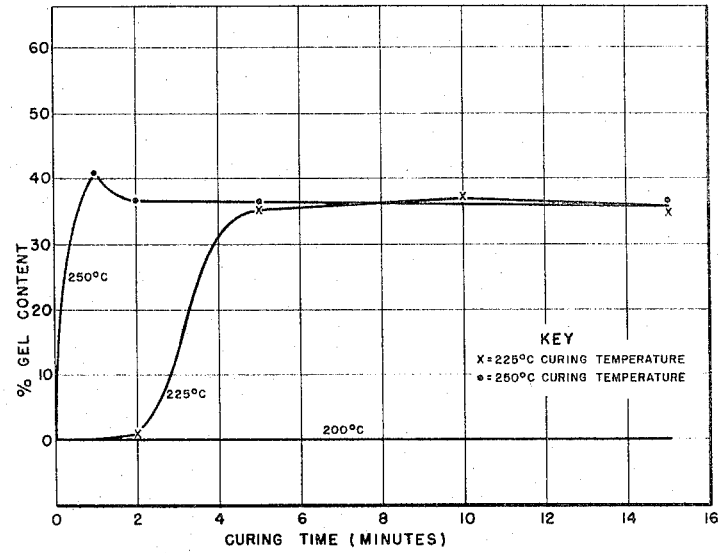

The crosslinking or curing temperature depends upon the polymer which is being crosslinked. This fact is shown graphically in FIGURE 1, attached. For oxidized polyethylene a temperature in excess of 150° C. is optimum. For polyethylene or blends and copolymers thereof a temperature in excess of 175° C. is preferably employed. For polypropylene we have found that it is necessary to use a temperature in excess of 200° C. In addition under these operable conditions we have found that curing time and temperature are not critical. Thus it is possible to cure over long (15–30 minute) periods without fear that the polymer will decrease appreciably in gel content. This is shown in FIGURE 4, attached, wherein polypropylene was cured for 15 minutes even at 250° C. without any significant fall off in percent gel content. This is an improvement over sulfur cured polymers whose properties tend to revert or degrade rapidly when curing is carried on for long periods of time beyond the optimum curing time and temperature.

The compositions to be crosslinked in accord with the present invention may include anti-oxidants, fillers, pigments, anti-static agents, plasticizers and the like within the scope of this invention. Such additives are usually added to the polymer composition by pre-blending prior to or during the compounding step. Operable fillers would include such materials as carbon black, clay, silica, alumina, carbonates, oxides, hydroxides, silicates etc. These filler materials normally are used in amounts ranging from 1 to 50% by weight in polymer compositions, but in certain cases may be present in amounts up to 80% by weight.

Throughout the instant invention the melt indices (MI) were measured under the conditions specified in ASTMD 1238–52T, except for isotactic polypropylene, in which instance the procedure was modified so that the test was run at 230° C. instead of 190° C. The densities of the polymers were measured under the conditions specified in ASTMD 1505–57T. The percent gel content of the polymers in the instant invention were measured by refluxing a weighed sample (approximately 0.5 g.) of polymer in a cellulose Soxhlet thimble in xylene (containing 0.3 weight percent 2,6-ditertiary-butyl-4-methyl-phenol for 24 hours. The insoluble portion of the polymer sample after drying was weighed to calculate percent gel as follows:

$$\text{percent gel} = \frac{\text{weight insoluble sample}}{\text{total weight sample}} \times 100$$

In example wherein an additive such as a filler e.g. carbon black, clay and the like was present in the compound the percent gel content was calculated so as to exclude the inert insoluble additive. Thus as used herein percent gel content is based solely on the polymeric hydrocarbon content of the cured polymer.

To measure stress/strain relationships (i.e., yield stress, percent elongation at yield point, tensile stress at failure, percent elongation at failure and Young's modulus at 1% elongation) the cured polymer films (25 mils thick) cut to ¼″ wide sample strips were placed in the jaws (2″ apart) of a tensile strength tester (Instron, Model TT, available from Instron Engineering Inc., Quincy, Massachusetts) and separated at a strain rate of 50% per minute at 23° C. and 50% relative humidity.

In all examples, unless otherwise noted, a Brabender Plastograph model PL–V2 equipped with a recording unit for measuring changes in torque was used for simple compounding of mixing of the polymer with the crosslinking agent. In general the procedure followed was to fuse the polymer at a temperature about 10–30° C. above its melting point for ten minutes at 30 r.p.m. in air and in the presence of about 0.2% of a suitable commercially available anti-oxidant. Examples of commercially available anti-oxidants include; 4,4′-thiobis(6-t-butylmetacresol), and 2,2′-methylene bis(4-ethyl-6-t-butylphenol). At this point the crosslinking agent is added and mixing is continued for an additional 5 to 15 minutes to obtain a homogeneous dispersion in the compound. For curing, samples of the compounds (approximately 12 g. in weight) were first pressed for 1 minute at no pressure followed by a 2 minute press at 1000 p.s.i. into films of 25 mil thickness using a Pasadena Platen Press set at temperatures at or slightly above the melting point of the compounded polymer. These premolded film samples of 25 mil thickness were cut into smaller strips of approximately 1.5 g. weight and then cured in the Pasadena Platen Press at a pressure of 1000 p.s.i. for periods ranging from 1 to 15 minutes at various curing temperatures. The samples were then removed from the press and cooled in air. Samples of the cured specimens were then used to calculate the percent gel content by the aforementioned xylene extraction method and to obtain the stress/strain data using the Instron tensile testing machine.

The following examples will more fully explain but especially not limit the present invention.

*Example 1*

30 g. of commercially available polyethylene having a melt index of 1.8 and a density of 0.912 were charged to a Brabender plastograph along with 0.07 g. 4,4′-thiobis (6-t-butylmetacresol) as an anti-oxidant, and milling was continued at a temperature of 140° C. After ten minutes 0.60 g. of p,p′-dibenzoylquinonedioxime sometimes referred to as p-quinonedioxime dibenzoate both of the formula,

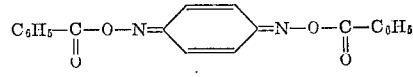

was added to the plastograph charge. Milling was continued for 5 minutes in order to obtain a homogeneous compounded mixture. No increase in torque was recorded by the plastograph recorder. The thus compounded polymer charge was removed from the plastograph and transferred to a Pasadena Platen Press manufactured by Pasadena Hydraulics Incorporated, Pasadena, California, Model P-315. Samples of the thus compounded polymer (approximately 12 g.) were pressed into film in a mold of 25 mil thickness at 150° C. for 1 minute at no pressure followed by a 2 minute press at 1000 p.s.i. pressure. The premolded polymer film was then cooled, cut into smaller samples (approximately 1.5 g.) and put back into the press for the curing step. For curing, the premolded film sample was pressed in a 25 mil thick mold of convenient size so that the mold was completely filled with polymer (approximately 1.5 g.) and no air space was present. The pressure was maintained at 1000 p.s.i. for 15 minutes at 150° C. at which time the pressure was released and the sample cooled. On characterization the sample contained 0% gel.

Example 1 was repeated except that the curing was performed at 175° C. On characterization the sample contained 0% gel.

Example 1 was repeated except that the curing was performed at 200° C. On characterization the sample contained 46.7% gel.

Example 1 was repeated except that the curing temperature was 250° C. The sample contained 64.6% gel.

*Example 2*

The procedure of Example 1 was followed except that the polymer was 30 g. of commercially available polyethylene having a melt index of 0.7 and a density of 0.96 and the crosslinking agent was 0.30 g. of p-quinonedioxime dibenzoate. The milling in the Brabender was carried out at a temperature of 160° C. After milling the above components together for 5 minutes the charge was removed from the Brabender and approximately 12 g. samples thereof were pressed into film (25 mil thickness) in a Pasadena Platen Press for 1 minute at 150° C. and no pressure followed by a 2 minute press at 150° C. and 1000 p.s.i. pressure. Thereafter the thus molded film was subjected to curing at a temperature of 225° C. for 15 minutes and 1000 p.s.i. pressure in the press. On characterization the thus cured polymer had a gel content of 22.3%.

*Example 3*

30 g. of commercially available isotactic polypropylene having a density of 0.905, a melt index of 4.4 and 96% heptane insoluble was charged to a Brabender plastograph along with 0.07 g. of 4,4′-thiobis(6-t-butylmetacresol) as an anti-oxidants. Milling was continued at a temperature of 190° C. for 15 minutes until the polymer was completely molten. At this point 0.6 g. of p-quinonedioxime dibenzoate was charged to the Brabender and milling was continued for 10 minutes. The thus milled polymer compound was transferred to a press wherein it was premolded to a film having a thickness of 25 mils at a temperature of 175° C. under atmospheric pressure for 1 minute and a pressure of 1000 p.s.i. for 2 minutes. The thus formed film was cut into strips (approx. 1.5 g. in weight) and then cured for 15 minutes at a temerature of 175° C. and a pressure of 1000 p.s.i. On characterization the gel content of the sample was zero percent. Example 3 was repeated except that the curing step was carried out for 15 minutes at a temperature of 200° C. On characterization the gel content here also was zero percent. Example 3 was repeated except that the curing step was carried out at a temperature of 225° C. for 15 minutes. On characterization the gel content of the crosslinked product was 36.2%.

The percent gel versus curing temperature data for a typical isotactic polypropylene sample are shown on FIGURE 1, attached. Similar data plotted on FIGURE 4, attached, show the unusually fast curing rate for this crosslinking reaction at 225° and 250° C.

Other aliquots of the above cured polypropylene samples were examined for difference in mechanical properties by measuring their densities and also their stress/strain relationship using an Instron Tensile Tester. The results can be tabulated as follows:

| Sample No. | A | B |
|---|---|---|
| Curing Cycle at 15 min., ° C. | 175 | 225 |
| Percent Gel | 0 | 36.2 |
| Density, g./ml. | 0.908 | 0.903 |
| Modulus, p.s.i. | 248,090 | 189,610 |
| Yield Stress, p.s.i. | (¹) | 3,985 |
| Percent elongation at Yield Point | (¹) | 15.3 |
| Stress at failure, p.s.i. | 4,645 | 3,549 |
| Percent elongation at failure | 10.3 | 637.0 |

¹ No yield point.

From these tabulated data we can see that the uncrosslinked Sample A is rigid (high modulus) but brittle (fails at only 10.3% elongation) and has poor solvent resistance at elevated temperatures (zero percent gel). Sample B is definitely crosslinked as evidenced by presence of 36.2% gel. Thus the solvent resistance and dimensional stability near or above its melting point are much improved. Further, the presence of a high yield point and a very high (637%) percent elongation at failure show this sample to be much more flexible and stronger as a result of its crosslinked structure.

*Example 4*

This example shows the ability of the crosslinking agents of the instant invention to crosslink blends of polyethylene and polypropylene.

15.5 g. of commercially available polyethylene having a melt index of 0.3 and a density of 0.96 and 15.5 g. of commercially available isotactic polypropylene having a melt index of 4.4 and a density of 0.91 along with 0.035 g. of 4,4'-thiobis(6-t-butylmetacresol), as an anti-oxidant, were charged to a Brabender plastograph and milled for 15 minutes at temperature of 190° C. under nitrogen. 0.6 g. (2 weight percent) of p-quinonedioxime dibenzoate was added to the polymer charge and milling was continued under nitrogen for an additional 5 minutes. The charge was removed from the Brabender and approximately 12 g. samples thereof were pressed into films of 25 mil thickness on a press at a temperature of 175° C. at atmospheric pressure for 1 minute and a presure of 1000 p.s.i. for 2 minutes. The thus molded film was cut into strips of 1.5 g. weight and cured in a press with 1000 p.s.i. pressure for 15 minutes at 175° C. On characterization the gel content of the thus cured polymer was zero percent.

Example 4 was repeated except that the curing temperature was increased to 225° C. for the 15 minute cycle. On characterization, the gel content now was found to be 31.3 percent.

As in Example 3, above, the thus cured specimens also were subjected to stress/strain analysis. The data are tabulated below:

| Sample No. | A | B |
|---|---|---|
| Curing Cycle at 15 min., ° C. | 175 | 225 |
| Percent Gel | 0 | 31.3 |
| Density, g./ml. | .933 | .929 |
| Modulus, p.s.i. | 259,870 | 213,480 |
| Yield Stress, p.s.i. | (¹) | 3,663 |
| Percent elongation at Yield Point | (¹) | 13.7 |
| Stress at failure, p.s.i. | 4,102 | 3,105 |
| Percent elongation at failure | 8.4 | 648 |

¹ No yield point.

As in Example 3, above, it can be concluded that the curing reaction caused by the p-quinonedioxime dibenzoate has led to improvements in this blend of solvent resistance, dimensional stability near or above the melting point, overall physical strength and flexibility at room temperature.

The following example shows the ability of the crosslinking agent of the instant invention to cure copolymers of ethylene and propylene. Copolymers of ethylene and propylene are well known in the art today and can be made in accord with the method described in Linear and Stereoregular Addition Polymers, page 380, Gaylord and Mark, Interscience Publishers Inc., New York, 1959.

*Example 5*

25 g. of a commercially available ethylene-propylene copolymer (58 mole percent ethylene) having a density of 0.87 were charged to a Brabender plastograph and milled therein for 10 minutes at 110° C. 1.0 g. p-quinonedioxime dibenzoate was added to the polymer charge and milling was continued for 10 minutes. A sample of the thus compounded copolymer (approximately 12 g.) was pressed into film of 25 mil thickness on a platen press at a temperature of 150° C. and atmospheric pressure for 1 min. and 1000 p.s.i. pressure for 2 minutes. The thus pressed polymer film was cut into strips (approximately 1.5 g. weight) and cured in a platen press at 1000 p.s.i. pressure for 15 minutes at 175° C. On characterization the thus cured polymer had a gel content of 4.0%. Example 5 was repeated except that the curing temperature was 225° C. The percent gel content was 69.1%.

*Example 6*

Example 5 was repeated except that 12.5 g. "H hydrite R" koalin clay was added to the Brabender charge. The clay filled copolymer after curing at 175° C. for 15 minutes at 1000 p.s.i. pressure had a gel content of 0.2% based on the polymeric hydrocarbon content. Example 6 was repeated except that the curing temperature was increased to 200° C. A gel content of 57.2% based on the polymeric hydrocarbon content resulted.

*Example 7*

Example 5 was repeated except that 12.5 g. easy processing channel carbon black was added to the Brabender charge. The carbon black filled copolymer after curing at 175° C. for 15 minutes at 1000 p.s.i. pressure had a gel content of 18.2% based on the polymeric hydrocarbon content. Example 7 was repeated except that the curing temperature was increased to 225° C. A gel content of 39.6% based on the polymeric hydrocarbon content resulted.

*Example 8*

28.0 g. of commercially available isotactic polypropylene having a melt index of 4.4 and a density of 0.91, 0.6 g. 4,4'-thiobis(6-t-butylmetacresol) and 14.0 g. of high abrasion furnace carbon black were charged to a Brabender plastograph and milled therein for 10 minutes at 190° C. 1.12 g. of p-quinonedioxime dibenzoate was added to the Brabender charge and milling was continued for 10 minutes. The filled polypropylene compound (approximately 12 g.) was pressed into 25 mil thick film on a platen press at a temperature of 175° C. for 1 minute at atmospheric pressure followed by a 1000 p.s.i. press for 2 minutes. The thus pressed film was cut into strips (approx. 1.5 g. in weight) and cured in a platen press at 1000 p.s.i. for 15 minutes at 225° C. On characterization the cured filled polypropylene had a gel content of 16.2% based on the polymeric hydrocarbon content.

*Example 9*

24.8 g. of commercially available polyethylene having a melt index of 0.7 and a density of 0.96 and 9.2 g. of calcium carbonate were charged to a Brabender plastograph and milled therein for 10 minutes at a temperature of 150° C. 0.7 g. of p-quinonedioxime dibenzoate was added to the Brabender charge and milling was continued for an additional 5 minutes until a uniform dispersion had been accomplished. The charge was removed from the Brabender and pressed on a platen press into film of 25 mil thickness at a temperature of 150° C. for 1 minute at atmospheric pressure and 2 minutes at 1000 p.s.i. pressure. The film was removed from the press and cooled. The thus cooled premolded film was cut into strips (approximately 1.5 g. in weight), returned to the press and cured under 1000 p.s.i. pressure for 15 minutes at a temperature of 200° C. On characterization the percent gel content of the thus cured product was 7.5% based on the polymeric hydrocarbon content. Example 9 was repeated except that the curing temperature was 225° C. The percent gel content increased to 81.3% based on the polymeric hydrocarbon content.

*Example 10*

34 grams of commercially available polyethylene having a melt index of 1.4 and a density of 0.96 which had previously been oxidized by passing air through it at a temperature of 120–130° C. to the extent that the carbonyl content thereof was equal to 0.65% along with 0.07 g. of 4,4'-thiobis(6-t-butylmetacresol) (as an anti-oxidant) were charged to a Brabender plastograph and milled therein for 15 minutes at a temperature of 150° C. The extent of oxidation of the polyethylene was determined by ascertaining the carbonyl content of the polymer by infrared analysis using the peak at 1720 cm.$^{-1}$. By the word "carbonyl" is meant primarily ketone and aldehyde groups. A Perkin Elmer Spectophotometer, Model 221, was used. The reported percent carbonyl is equal to $$\frac{\text{grams C}=0}{\text{grams polymer}} \times 100$$

1.2 g. of p-quinonedioxime dibenzoate was added to the charge and milling was continued for 15 minutes. The charge was removed from the Brabender and pressed at 1000 p.s.i. pressure for 2 minutes into a film of 25 mil thickness. The film was then cured at a pressure of 1000 p.s.i. for 15 minutes at a temperature of 175° C. On characterization the thus cured sample had a percent gel content of 65.5%.

The following examples show the operability of p-quinone dioxime of the formula,

as a crosslinking agent in the instant invention.

*Example 11*

34 g. of commercially available polyethylene having a melt index of 0.7 and a density of 0.96 and 0.07 g. of 4,4'-thiobis(6-t-butylmetacresol) as an antioxidant were charged to a Brabender plastograph and milled therein for 15 minutes. 0.25 g. of p-quinone dioxime was added to the Brabender charge and milling was continued for an additional 15 minutes. No increase in torque was noted during the milling. Samples (approximately 12 g. in weight) of the charge were pressed into film (25 mil thickness) at a temperature of 150° C. at atmospheric pressure for 1 minute and 1000 p.s.i. pressure for 2 minutes. The molded film sample was then cut into strips (1.5 g.) and cured in a platen press under 1000 p.s.i. pressure for 15 minutes at a temperature of 175° C. On characterization the cured sample contained zero percent gel content. Example 11 was repeated except that the curing temperature was increased to 200° C. On characterization the cured sample had a gel content of 0.9%.

Example 11 was repeated except that the curing temperature was 225° C. On characterization the thus cured sample had a gel content of 25.9%.

*Example 12*

Commercially available polyethylene having a melt index of 2.2 and a density of 0.96 which was previously oxidized by passing air through the polymer at 125° C. for 11 hours until the carbonyl content was 0.67% along with 0.07 g. of 4,4'-thiobis(6-t-butylmetacresol) as an antioxident were charged to a Brabender plastograph and milled therein at a temperature of 155° C. for 15 minutes. 0.11 g. of p-quinone dioxime was added to the Brabender. Milling was continued for an additional 5 minutes. The thus milled charge was transferred from the Brabender to a platen press wherein it was pressed into 12 g. film sample (25 mil thickness) at a temperature of 150° C. and atmospheric pressure for 1 minute followed by a press at 1000 p.s.i. pressure for 2 minutes. The premolded film was cut into strips (1.5 g.) and cured in a platen press under 1000 p.s.i. pressure for 15 minutes at a temperature of 150° C. On characterization the percent gel content of the thus cured sample was 9.8%. Example 12 was repeated except that the curing temperature was 175° C. The percent gel content was 20.1%.

*Example 13*

15.5 g. of commercially available polyethylene having a melt index of 0.3 and a density of 0.96 and 15.5 g. of commercially available polypropylene having a melt index of 4.4 and a density of 0.91 along with 0.035 g. of 4,4'-thiobis(6-t-butylmetacresol) as an antioxidant were charged to a Brabender plastograph and milled therein for 15 minutes at a temperature of 190° C. 0.48 g. of p-quinone dioxime were added to the Brabender charge and milling was continued for an additional 5 minutes. The compounded charge was pressed into film (25 mil thickness) on a platen press at a temperature of 175° C. at atmospheric pressure for 1 minute followed by a 1000 p.s.i. press for 2 minutes. The molded film sample was then cut into strips (1.5 g.) and cured in a platen press under 1000 p.s.i. pressure for 15 minutes at a temperature of 225° C. On characterization the percent gel content of the thus cured sample was in excess of 10%.

*Example 14*

32 g. of commercially available ethylene-propylene copolymer (58 mole percent ethylene) having a density of 0.87 were charged to a Brabender plastograph and milled therein for 10 minutes at 110° C. 1.36 g. of p-quinone dioxime was added to the polymer charge and milling was continued for 10 minutes. The thus compounded copolymer was pressed into film (25 mil thickness) on a platen press at a temperature of 150° C. at atmospheric pressure for 1 minute and 1000 p.s.i. pressure for 2 minutes. The polymer film was then cut into strips (1.5 grams) and cured on a platen press at 1000 p.s.i. pressure for 15 minutes at 225° C. On characterization the thus cured polymer had a gel content in excess of 20%.

To date using p-quinone dioxime it has not been possible to crosslink polypropylene at temperatures up to and including 250° C. However, we have found that if you take p-quinone dioxime and add aliphatic or aromatic carboxylic acids and/or anhydrides or esters of aliphatic or aromatic carboxylic acids you can generate quinone dioxime esters in situ which will crosslink polypropylene as well as the other polyolefin polymers described herein. p-quinone dioxime ester precursors such as these have been found to be effective for crosslinking not only in polypropylene but also in the other polyolefin polymers as described in earlier portions of the invention. The following example shows such a result.

*Example 15*

34 g. of commercially available polypropylene having a melt index of 4.4 and a density of 0.91 along with 0.07 g. 4,4'-thiobis(6 - t - butylmetacresol) as an anti-oxidant were charged to a Brabender plastograph and milled therein at a temperature of 190° C. for 15 minutes. 0.346 g. of p-quinone dioxime along with 1.13 g. of benzoic anhydride were added to the Brabender and milling was continued for 5 minutes. The charge was removed from the Brabender and pressed into film (25 mil thickness) at 175° C. at atmospheric pressure for 1 minute and at 1000 p.s.i. for 2 minutes. The premolded film sample was then cut into strips (approximately 1.5 g.) and cured in a platen press with 1000 p.s.i. pressure for 15 minutes at a temperature of 225° C. The thus cured sample on characterization had a gel content more than 20%.

The process of this invention is applicable to both atactic and isotactic polypropylene and polyethylene as well as copolymers or mixtures and blends thereof. The curing agents described herein may be blended homogeneously into the molten polymer at convenient processing temperatures in standard commercial equipment such as mixers, mills, extruders and the like, or they may be applied to the surface of the polyolefin object prior to the curing step so that a surface or "skin" curing effect can be obtained.

The crosslinked polymers of the instant invention have many and varied uses. The improved properties of the cured polymer, i.e., solvent resistance, dimensional stability at elevated temperature and improved resistance to environmental stress cracking make the crosslinked polyolefins of the instant invention useful as pipe, wire and cable jacketing, film, tubing and the like.

I claim:

1. The process of crosslinking polyethylene which has been oxidized by heating at about 120–130° C. in air which comprises mixing together 100 parts by weight of said oxidized polyethylene and 0.1 to 20 parts by weight of an ester of quinone dioxime as the sole essential crosslinking agent and thereafter heating the resulting mixture at a temperature of at least 150° C.

2. The process according to claim 1 wherein the ester of quinone dioxime is p-quinone dioxime dibenzoate.

3. A crosslinkable composition consisting essentially of 100 parts by weight of oxidized polyethylene containing at least 0.65% carbonyl and 0.1 to 20 parts by weight of an ester of quinone dioxime as the sole essential crosslinking agent.

4. The composition according to claim 3 wherein the ester of quinone dioxime is p-quinone dioxime dibenzoate.

5. The composition according to claim 3 in which 1 to 80 parts of a filler selected from the group consisting of carbon black, calcium carbonate, and clay is added to the composition.

6. The process of crosslinking polyethylene which has been oxidized until it contains a carbonyl content of at least 0.65% which comprises mixing together 100 parts by weight of said oxidized polyethylene and 0.1 to 20 parts by weight of an ester of quinone dioxime as the sole essential crosslinking agent and thereafter heating the resultant mixture at a temperature of at least 150° C.

7. The process according to claim 6 wherein the ester of quinone dioxime is p-quinone dioxime dibenzoate.

8. The process according to claim 6 in which 1 to 80 parts of a filler selected from the group consisting of carbon black, calcium carbonate and clay is admixed with the polyethylene-ester of quinone dioxime mixture prior to heating.

References Cited by the Examiner

UNITED STATES PATENTS

| | | | |
|---|---|---|---|
| 2,393,321 | 1/1946 | Hworth | 260—41.5 |
| 2,888,424 | 5/1959 | Precopio et al. | 260—41 |
| 2,982,714 | 5/1961 | Robinson et al. | 260—41 |
| 3,012,020 | 12/1961 | Kirk et al. | 260—41 |
| 3,264,252 | 8/1966 | Smith et al. | 260—41 |

MORRIS LIEBMAN, *Primary Examiner.*

ALLAN LIBERMAN, LEON J. BERCOVITZ,
*Examiners.*

J. S. WALDRON, K. B. CLARKE, *Assistant Examiners.*